Jan. 28, 1964 W. L. NALL 3,119,207
DOOR EDGE FINISHING TOOL
Filed Jan. 2, 1962
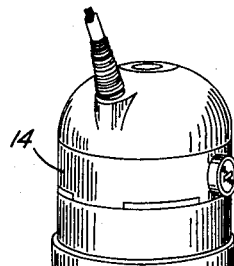
FIG. 1
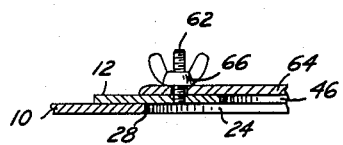
FIG. 2
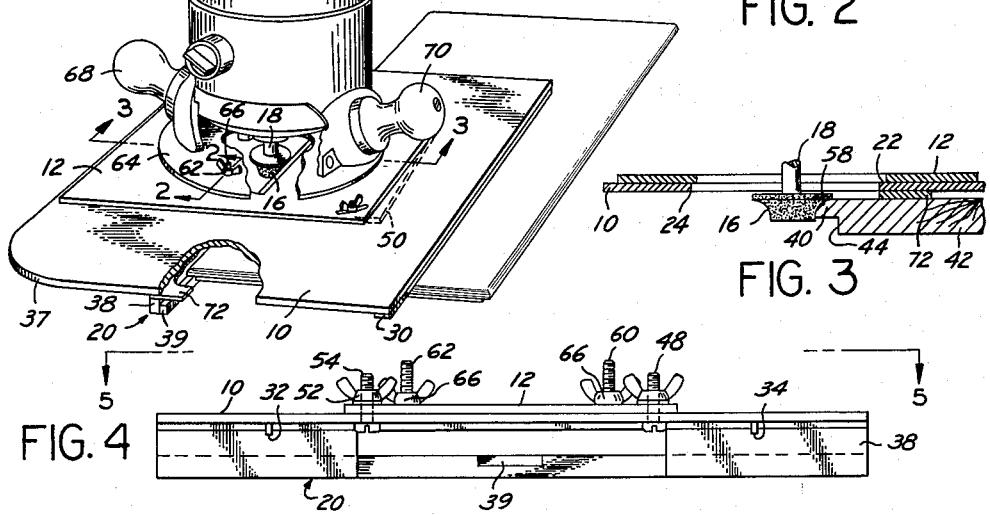
FIG. 3
FIG. 4
FIG. 5
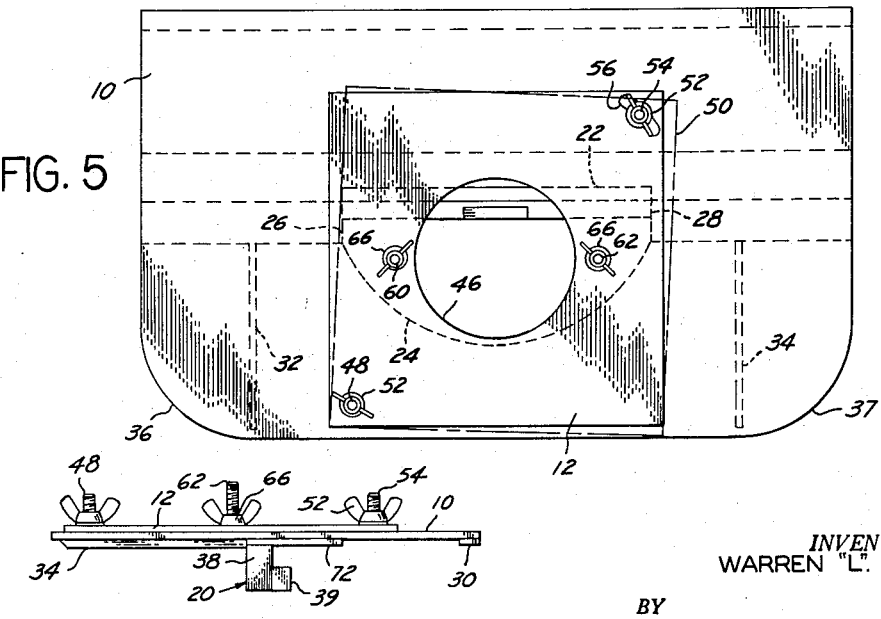
FIG. 6
*INVENTOR.*
WARREN "L". NALL
BY
ATTORNEY

United States Patent Office 3,119,207
Patented Jan. 28, 1964

3,119,207
DOOR EDGE FINISHING TOOL
Warren L. Nall, 320 Vinton St., Pomona, Calif.
Filed Jan. 2, 1962, Ser. No. 163,725
5 Claims. (Cl. 51—170)

The present invention relates generally to finishing tools; more particularly, the invention relates to a powered apparatus for finishing rough edge surfaces of panels such as cabinet doors.

In the fabrication of panels such as cabinet doors for building construction, the panels or doors are customarily with rough edges, which result from the operation of machines such as high-speed routers or milling machines, to provide a desired edge surface such as a curved surface or an undercut lip or flange. Because of the cross-grained composition of laminated plywood and other materials which are typically used for such articles, a cutting blade or cutting elements of such machines leave rough or unfinished edge surfaces or lip surfaces. To provide a finished or smooth edge surface, such as is required in house construction, it is necessary to finish or smooth the edges of the panels or doors. This requires separate machining operations at the fabricating plant or special operations at the construction site where the panels or cabinet doors are installed. In many typical instances, the panels or doors are required to be fitted and installed at construction sites. It is generally not feasible or convenient at construction sites to utilize stationary machine tools for finishing the edge surfaces. It is customary to finish and smooth the edge surfaces of the panels by manual operations, thereby involving considerable time and therefore expense.

The present invention provides a readily portable apparatus or tool for the convenient and rapid finishing and smoothing of the edge surfaces of panels such as previously routed or milled cabinet doors or panels. The device of the invention is particularly useful in finishing curved edges and undercut lips on panel edges. The apparatus is such that it may be moved relative to the panel being finished or the panel may be moved relative to the device.

The panel edge finishing apparatus of the invention preferably includes a platform which is slidable relative to a panel, the edge of which is to be finished. Guide means are provided in the form of a channel adjacent to the under surface of the platform for slidably receiving and for accurately positioning the edge of the panel. An abrasive wheel having an appropriately configurated peripheral abrasive surface is positioned to engage the edge of the panel. A motor is provided on the apparatus for operating the wheel to finish the panel edge while the panel moves relative to the apparatus. The motor is preferably mounted on a mounting plate which is adjustably mounted on the platform, thereby permitting the selective positioning of the mounting plate and motor to position the abrasive wheel for producing a selected depth of cut on the panel edge surface. For the finishing of curved undercut lips on the edges of panels such as cabinet doors, the guide means or guide channel include an elongated lug configurated to fit against the undercut shoulder of the panel lip to retain the lip during the finishing operation. For the finishing of curved edge surfaces, the abrasive wheel is provided with an arcuate abrasive surface for engaging the panel edge.

It is therefore an object of the present invention to provide an apparatus for the finishing of rough edge surfaces of panels such as cabinet doors utilized in building construction.

An object of the invention is to provide an apparatus according to the foregoing object which is simplified, effective and conveniently usable.

An object of this invention is the provision of an apparatus according to the foregoing objects which is adapted for the finishing of curved edge surfaces and undercut lips on panel edges.

An object of the invention is to provide an apparatus for finishing panel edges which is adjustable to provide for the taking of a desired cut on a panel edge.

An object of this invention is the provision of a finishing apparatus according to the foregoing objects which may be utilized by moving the apparatus relative to a panel being finished or by moving a panel relative to the apparatus.

It is an object of this invention to provide an apparatus according to the foregoing objects wherein the tool is carried by a platform which is slidable relative to the panel being finished and wherein a guide channel on the panel retains and positions the panel relative to an abrasive cutting element on the apparatus.

Other objects, features and advantages of the present invention will become apparent to those versed in the art from a consideration of the following description, the appended claims and the accompanying drawing, wherein:

FIGURE 1 is a perspective view, partially sectioned, illustrating the door edge finishing apparatus of the invention in operative relation with a panel, an edge of the panel being positioned in a guide channel of the apparatus;

FIGURE 2 is an enlarged fragmentary sectional view taken at line 2—2 of FIGURE 1, showing certain details of construction;

FIGURE 3 is an enlarged fragmentary sectional view taken at line 3—3 of FIGURE 1, showing the operative position of the abrasive wheel relative to the undercut lip of a panel edge;

FIGURE 4 is a side elevational view of a portion of the apparatus of FIGURE 1;

FIGURE 5 is a plan view taken at line 5—5 of FIGURE 4, showing details of the platform and mounting plate components of the apparatus of FIGURES 1 and 4; and FIGURE 6 is an end elevational view of that portion of the apparatus of FIGURE 1 which is shown in FIGURE 5.

Referring to the drawing, a preferred embodiment of the panel edge finishing tool of the invention is shown as including a platform 10, a mounting plate 12 on the platform, a motor 14 secured to the mounting plate, an abrasive wheel 16 on a spindle 18 which extends from the motor, and an elongated guide channel 20 which depends from the under surface of the platform.

The platform has an open therethrough which has a straight side 22, an arcuate side 24 and ends 26, 28. Along one edge of the platform, a spacing strip 30 is provided; and spacing ribs 32, 34 are provided at the opposite edge of the platform. The strip and ribs slidably engage a panel being finished, as indicated in FIGURE 1. The outer corners of the platform are rounded, as indicated at 36 and 37. The guide channel 20 is formed by the platform and an elongated guide bar 38, which may be formed integrally with the platform, as when these parts are cast of a metal such as aluminum, or which may be secured as by screws (not shown) to the under surface of the platform. An elongated lug 39 is provided on the lower portion of the guide bar 38, thereby providing a configuration which is adapted to slidably receive and retain an overlapping lip 40 of the edge of a door panel 42, as shown in FIGURE 1. The edge of the panel is undercut at 44, thereby defining the lip 40.

The mounting plate 12 has an opening 46 and is pivotally mounted on platform 10 by a threaded post 48. The mounting plate is adjustably mounted on the platform and is secured in adjusted positions such as that indicated at 50 in phantom outline in FIGURE 5. The securing in a selected adjusted position is accomplished by a wing nut 52 and a threaded post 54 which is mounted on a platform and which extends through an arcuate slot 56 at the corner of the mounting plate opposite from the corner at which the pivot post 48 is positioned.

It will be understood from the foregoing and from the drawing that means are provided for the positional adjustment of the mounting plate relative to the platform 10 to prevent the selected positioning of the motor and the abrasive wheel relative to the platform 10. This permits the selected positioning of the abrasive wheel 16 relative to a panel edge surface being finished, thereby permitting selection of the depth of cut of the abrasive wheel on the panel edge.

The motor 14 is secured to the mounting plate 12 by means of threaded posts 60, 62 which extend through a flange 64 of the motor housing and which are provided with thumb or wing nuts 66. Handles or knobs extend from the motor housing, as shown in FIGURE 1, to provide for the manual manipulation of the tool and the moving of the tool along the edge of a panel. Obviously, the tool may be fixedly mounted and a panel may be moved relative to the tool for the finishing of a panel edge.

It will be understood that the peripheral abrasive surface of the wheel may have other configurations than the arcuate concave form shown in the drawing. The configuration shown is adapted for finishing the type of curved undercut lip shown in FIGURE 3. By utilizing appropriate abrasive wheel surfaces, the apparatus of the invention may be utilized for performing operations on edge surfaces of various different materials and of different configurations.

In the operation of the finishing tool with the apparatus and a panel arranged as illustrated and described, the panel edge to be finished is positioned in the guide channel, as indicated in FIGURES 1 and 3.

In the case of the door edge herein shown and described, the lip 40 of the door edge rests upon or is retained by the lug 38 of the channel, and the upper surface of the door is in sliding relation with a strip 72 which forms the upper portion of the channel. The wheel 16 is positioned with its peripheral abrasive surface extending into the guide channel to operatively engage the lip 40. As hereinbefore described, the wheel position is adjustable by the selective positioning of the mounting plate relative to the platform 10. With the wheel 16 being rotated by the motor, the finishing tool is moved along the door edge while the abrasive wheel smooths and finishes the edge surface of the door. The depth of the cut depends upon the selective adjustment of the mounting plate 12 relative to the platform 10. As hereinbefore mentioned, the tool may be held stationary, as by a vise, while the door or panel is moved relative to the tool.

Those skilled in the art will appreciate that the present invention achieves the objects and realizes the advantages hereinbefore mentioned.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. An apparatus for finishing a curved panel edge, comprising platform means slidable relative to a panel, elongated guide means adjacent to the under surface of the platform means for slidably receiving and positioning an edge of said panel, a wheel having an arcuate abrasive surface positioned between the ends of the guide means to engage said edge of the panel, power means on the apparatus for rotating the wheel to smooth the panel edge during relative movement between the panel and the apparatus, said guide means having a first portion engaging under the panel edge and a portion extending between the first portion and the platform.

2. A panel edge finishing machine comprising a platform slidable relative to the panel and having an opening therein, means defining an elongated L-shaped guide channel adjacent to the under surface of the platform for slidably receiving and positioning the panel edge, a mounting plate pivotally mounted on the platform for relative positional adjustment, said mounting plate having an opening therein registering with the platform opening, a motor mounted on the mounting plate and having its spindle extending through said openings in the mounting plate and platform, an abrasive wheel on said spindle and positioned to engage said panel edge, and means securing the mounting plate in a selected adjusted position relative to the platform to position the abrasive wheel in operative engagement with the panel edge.

3. An apparatus for finishing a curved undercut lip on the edge of a panel, said apparatus comprising a platform, means defining an elongated guide channel adjacent to the platform and shaped to engage against as well as underneath said panel lip, said means including an elongated lug forming a part of said channel and configurated to fit against the undercut shoulder under the panel lip to retain and guide the panel lip, a wheel having an arcuate abrasive surface positioned to engage the curved panel lip at a position intermediate the ends of the channel, and power means on the apparatus for rotating the wheel to finish the panel lip during relative movement between the panel and the apparatus, an intermediate section of the portion of the guide means which engages against the panel lip being interrupted to accommodate said wheel.

4. An apparatus for finishing a curved undercut lip on the edge of a panel, said apparatus comprising a platform, means defining an elongated guide channel adjacent to the platform for receiving and positioning said panel lip, said means including an elongated lug forming a part of said channel and configurated to fit under the lip and against the undercut shoulder of the panel lip to retain and guide the panel lip, a mounting plate adjustably mounted on the platform, a motor secured to the mounting plate, a wheel operated by the motor and having an arcuate peripheral abrasive surface for operative engagement with the panel lip, and adjustment means for selectively positioning the adjustably mounted mounting plate to position the wheel abrasive surface for producing a selected depth of cut on the panel lip, said lug being continuous but said first means having an interrupted section adjacent the platform to accommodate said wheel.

5. An apparatus for finishing a panel edge surface comprising a platform slidable relative to the panel having an opening therethrough, means extending from the lower surface of the platform to define an elongated guide channel for receiving and positioning said panel edge, a mounting plate having an opening therein in registration with the opening in the platform, a motor secured to the mounting plate with the spindle thereof extending through said platform and mounting plate openings, a wheel on said spindle and positioned with its peripheral abrasive surface operatively engaging said panel edge surface in the guide channel, means pivotally mounting the mounting plate to the platform at a first corner of the mounting plate for adjusting the position of said wheel relative to the panel edge surface, and means at a corner of the mounting plate opposite from said first corner for releasably securing the mounting plate and wheel in adjusted positions.

(References on following page)

References Cited in the file of this patent

UNITED STATES PATENTS

| | | |
|---|---|---|
| 1,658,185 | Carter | Feb. 7, 1928 |
| 1,751,816 | Hunter | Mar. 25, 1930 |
| 2,073,861 | Wolf | Mar. 16, 1937 |
| 2,528,511 | Graham et al. | Nov. 7, 1950 |
| 2,609,018 | Bjorklund | Sept. 2, 1952 |
| 2,705,032 | Pearson | Mar. 29, 1955 |
| 2,726,690 | Schacher | Dec. 13, 1955 |
| 2,756,785 | Godfrey | July 31, 1956 |
| 2,878,842 | Pickersgill | Mar. 24, 1959 |
| 2,970,618 | Mitchell | Feb. 7, 1961 |